Sept. 4, 1951 C. E. TACK ET AL 2,567,157
ROTOR BRAKE
Filed April 9, 1947 2 Sheets-Sheet 1
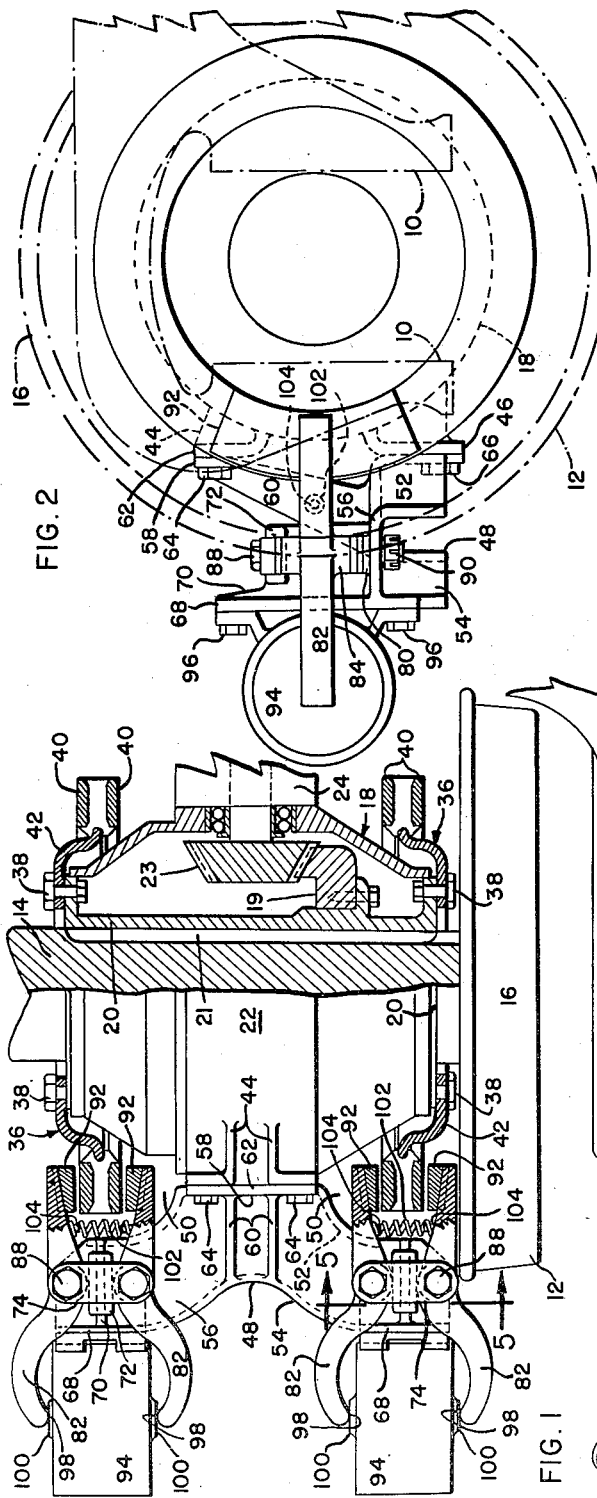
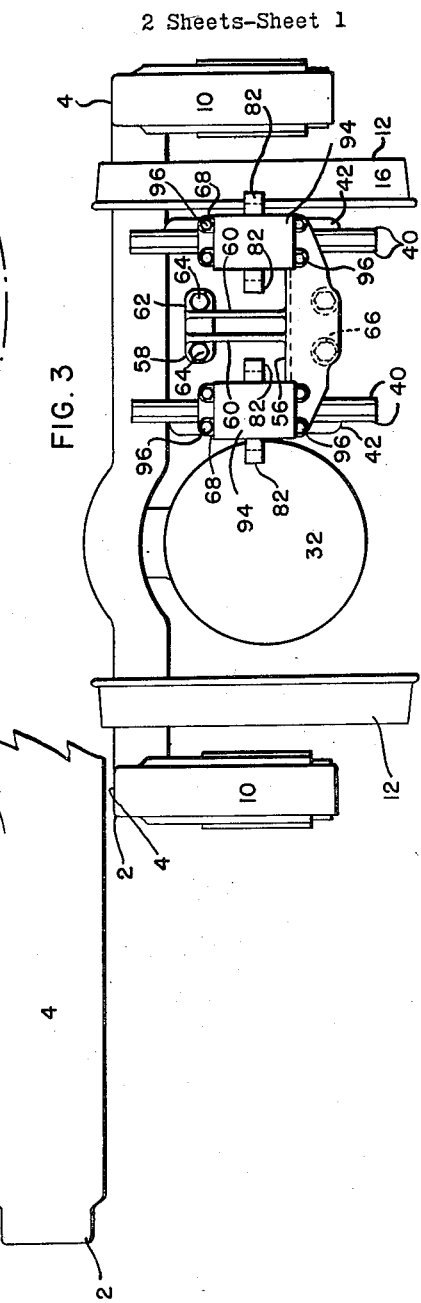
INVENTORS
CARL E. TACK
WESLEY A. HELSTEN
BY
ATTORNEY

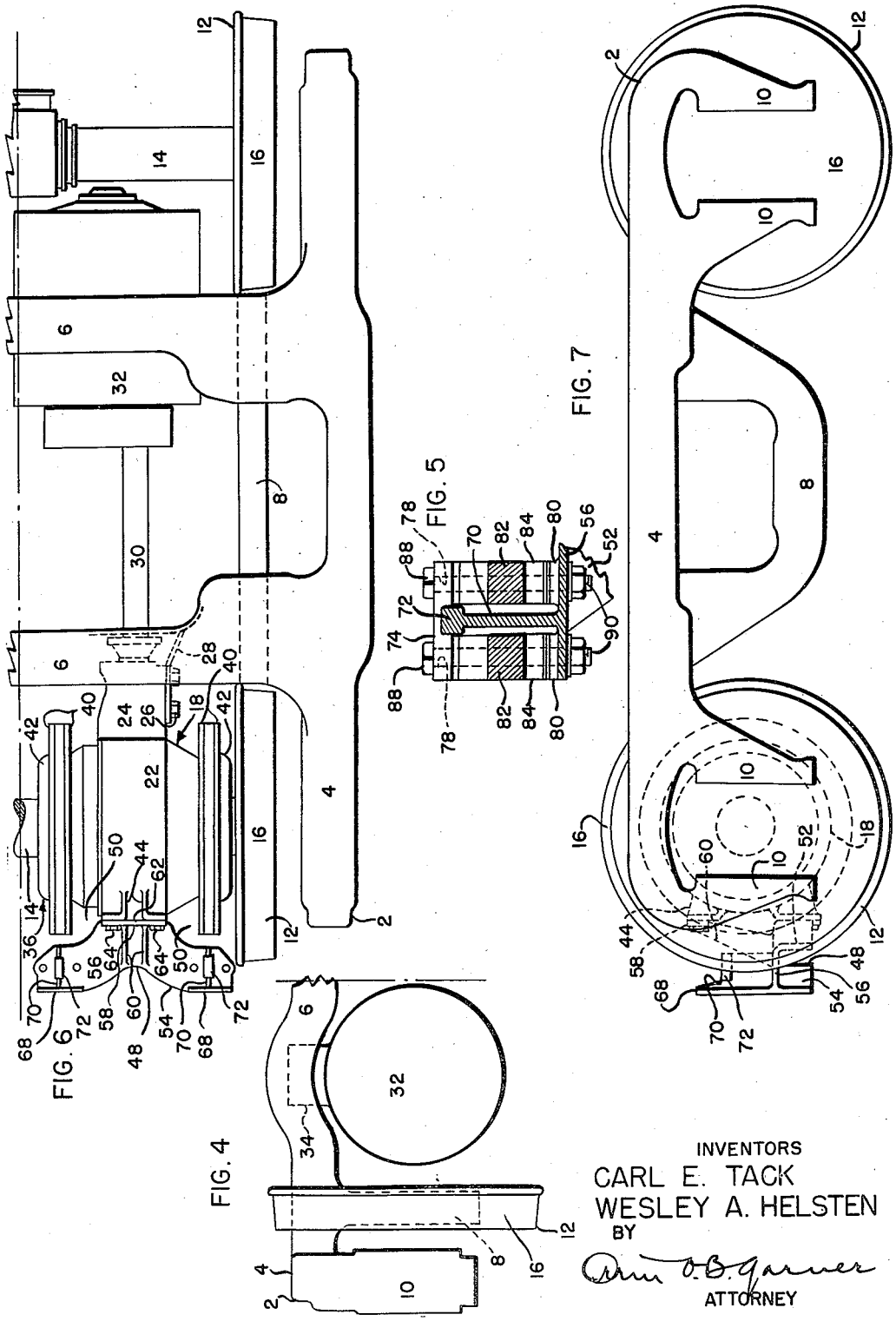

Patented Sept. 4, 1951

2,567,157

UNITED STATES PATENT OFFICE 2,567,157

ROTOR BRAKE

Carl E. Tack and Wesley A. Helsten, Chicago, Ill., assignors to American Steel Foundries, Chicago, Ill., a corporation of New Jersey Application April 9, 1947, Serial No. 740,428

11 Claims. (Cl. 188—59)

The invention relates to a brake arrangement for a railway car truck and especially to a brake design commonly called off-wheel wherein brake discs are supported to rotate with the wheel and axle assembly to afford braking surfaces independently of the periphery of the wheels.

One object of the invention is to devise an off-wheel brake arrangement wherein brake discs and brake means therefor are directly supported by the wheel and axle assemblies.

Another object of the invention is to devise a compact, simple and efficient off-wheel brake arrangement such as will meet all requirements under service conditions.

A further object of the invention is to devise such an arrangement as that described for a motor driven truck wherein each wheel and axle assembly supports motor driven gear means and a housing therefor, the housing having a torque connection with the truck frame and carrying a bracket in turn supporting brake means for brake discs secured to the opposite ends of a quill connected to the gear means and the axle of the assembly for rotation with the latter upon actuation of the former.

A still further object of the invention is to provide in the brake arrangement described a mounting for the brake shoe carrying levers such as will facilitate the assembly or disassembly of the same with respect to the supporting bracket.

These and other objects of the invention will be apparent from the specification and the drawings, wherein in certain views some parts are omitted where better shown in other views.

In the drawings, Figure 1 is an enlarged plan view of one-quarter of a railway car truck showing the invention applied thereto with the rotors and brake levers shown in horizontal section, it being understood that the diagonally opposite corner of the truck may be similarly arranged.

Figure 2 is a side elevation of the structure shown in Figure 1.

Figure 3 is an end elevation of the structure illustrated in Figures 1 and 2, the view being taken from the left thereof and showing the whole truck.

Figure 4 is a fragmentary right end elevation of the structure shown in Figures 1 and 2, and Figure 5 is a fragmentary sectional view of the bracket supporting the brake mechanism and showing the mounting of the brake levers thereon, the section being taken substantially along line 5—5 of Figure 1. Figure 6 is a top plan view of half the car truck, and Figure 7 is a side elevation of the truck as shown in Figure 6.

Describing the invention in detail, the truck structure 2 comprises spaced side rails or side frames 4, 4 integrally joined intermediate their ends by spaced transoms 6, 6, the transoms carrying integral bolster cradles 8 serving as a means of support for a bolster (not shown). The ends of each side rail are formed with pedestals or legs 10, 10 providing a connection for journal boxes (not shown) affording usual journal connections for spaced wheel and axle assemblies, generally indicated 12, 12.

Each wheel and axle assembly comprises an axle 14 with wheels 16 axially spaced thereon. On each axle 14 intermediate the wheels thereon at a point adjacent one of said wheels is mounted a gear box mechanism generally indicated 18, said mechanism comprising the usual gear means for drawing the associated wheel and axle assembly, the gear means being diagrammatically shown in Figure 1 and including a bevel gear 19 suitably arranged and connected to a quill 20 sleeved over the axle and keyed thereto, as at 21, for rotation therewith, said quill projecting beyond the opposite edges of the housing 22 encasing said gear means therewithin. The bevel gear 19 is meshed with a pinion gear 23 operatively connected to a drive shaft 30 (Figure 6) hereinafter described.

The housing 22 centrally on one side thereof is formed with an internal sleeve member 24, the sleeve member being connected as by bolts 26, 26 (Figure 6) to the bracket 28 carried by the adjacent transom 6 and affording a torque connection for the housing 22. The sleeve 24 supports a drive shaft 30 connecting the gear means with a motor 32 (diagrammatically illustrated) secured to the other of said transoms 6 as at 34 (Figure 4). A more detailed description of the driving mechanism and gear means will be omitted since they form no part of this invention and are well known in the art.

At each end of the quill 20 is fastened a rotor, generally indicated 36, as by bolts 38, 38 (Figure 1), each rotor comprising the usual brake discs 40, 40 supported on a hub member 42 sleeved over said axle 14, the hubs being bent or flanged toward each other so that the rotors are in sleeved relationship with the housing.

The housing 22 at points intermediate said rotors is provided with spaced upper and lower mounting flanges 44 and 46 to which is secured intermediate its ends a bilaterally symmetrical bracket 48 substantially V-shaped in plan, the same being offset at each end to define a pocket 50 with said housing, each pocket 50 containing brake shoes hereinafter described and the associated rotor 36.

The bracket 48 comprises spaced inboard and outboard walls 52 and 54 joined at their upper edges by a top wall 56, said walls forming a pair of oppositely extending legs, as best seen in Figure 1. On top of the top wall 56, centrally thereof, is formed a member generally indicated 58 for securing the bracket to the upper flanges 44, said member comprising spaced upstanding ribs 60, 60 merging at their lower ends with said top wall and joined at their upper ends by a cross-piece 62 fixed to said upper flanges as by bolts 64, 64. The lower side of the bracket may be secured to the housing by bolts 66, 66 (Figures 2 and 3) passing through said lower flanges and the inboard wall 52 of the bracket at points intermediate the ends thereof.

Projecting from the top wall 56 of the bracket adjacent the ends of said bracket in vertical alignment with the outboard wall 54 thereof are formed spaced upstanding mounting plates 68, 68. The juncture of each plate with said top wall is reinforced by a vertical web or gusset 70 extending transversely of said top wall 56 in radial alignment with the adjacent rotor, each rib 70 comprising intermediate its ends a horizontally disposed thickened portion or rib 72 (Figure 5).

Atop each thickened portion 72 is removably seated a link 74 (Figures 1 and 5), said thickened portion being received within a complementary recess formed centrally on the underside of the associated link to afford a tongue and groove connection between the link and the rib.

The link 74 is provided with vertical openings 78, 78 at opposite ends thereof vertically aligned with bushed openings within bosses 80, 80 formed directly below the ends of said link on the top wall 56 of the bracket adjacent opposite sides of the rib 70.

At opposite sides of each rib 70 are disposed a pair of mating levers 82, 82, each lever being formed intermediate its ends with a bushel hollow hub 84 seated on the adjacent boss 80 (Figure 5), the hub extending to the adjacent end of the link 74 thereabove. Within each opening 78 is received a bolt or pin 88, said bolt projecting through aligned openings in the adjacent hub 84 and boss 80. The lower end of each bolt is secured by a nut 90.

It will be observed that the bolts 88, 88 serve not only as securing means for the link, but also afford a fulcrum for the levers 82, 82. In this connection it may also be noted that the link serves to position the bolts and takes radial thrusts imposed upon the bolts by the levers during a braking operation, lengthwise movement of the link being prevented by the tongue and groove engagement of the link with the rib 70, as hereinbefore described.

The inboard ends of the mating levers are disposed at opposite sides of the adjacent rotor and have rigidly fixed thereto arcuate brake shoes 92, 92, said shoes being so positioned on the levers that upon actuation of the same the friction face of each shoe is brought into substantially full face engagement with the friction surface on the adjacent friction disc 40.

The outboard ends of each pair of mating levers extends at opposite sides of a double acting cylinder 94 (Figures 1 and 2) fixed as at 96, 96 to the adjacent mounting plates 68 and to the outboard wall of the bracket.

The ends of the brake levers 82, 82 adjacent the cylinder 94 may be formed with arcuate raised pads for abutment as at 98, 98 with pistons 100, 100 at opposite ends of the double-acting cylinder 94, said cylinder thus serving as actuating means for the associated levers. Release means for each pair of levers is provided, in the form of a compression spring 102, the opposite ends of which may be sleeved over studs or lugs 104, 104 on the respective levers.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In an off-wheel brake arrangement, a wheel and axle assembly comprising an axle with spaced wheels rotatable therewith, a truck frame supported on said assembly, a quill between the wheels and fixed to the axle for rotation therewith, a brake rotor connected to each end of said quill, a gear housing rotatably mounted on said quill between said rotors and extending thereinto at opposite ends, a torque connection between one side of said housing and said frame, a brake support comprising a beam member removably connected intermediate its ends to the housing in an area diametrically opposite said torque connection, said member being offset at opposite ends away from said housing outwardly of the rotors and extending beyond the rotors, a mounting plate at each end of said member, a cylinder power device mounted on each plate, a pair of levers disposed at opposite sides of each rotor removably pivoted intermediate their ends to said member, and brake means carried by the levers at one of their ends for braking cooperation with the related rotor, said levers being operatively associated at their other ends with respective power devices.

2. In a brake arrangement, a brake frame comprising an inverted channel-section member with a top wall and inboard and outboard walls, spaced cylinder mounting plates fixed to the top wall of said member and vertically aligned with said outboard wall, a transverse rib extending from each plate to said top wall and having a thickened portion intermediate its ends, a link seated on said thickened portion and in tongue and groove engagement therewith, brake levers disposed at opposite sides of said rib between said top wall and said link, and pivot means extending through said link, the respective levers and said top wall, and affording a fulcrum for said levers and securing said link on said rib, said link maintaining said means in predetermined positions irrespective of forces exerted thereagainst upon actuation of said levers.

3. A railway brake unit comprising a brake frame including a wall, with an angularly related web fixed thereto, a portion of said web extending approximately parallel to said wall, a link approximately parallel to said wall having a tongue and groove interlock with said portion, brake levers bearing against said link and said wall, readily removable pivot means extending through said levers and connected to said link and wall to maintain the same in assembled relationship, power means between said levers for actuating the same, and a web integral with said wall and first-mentioned web and extending longitudinally of said frame and supporting said power means.

4. In a brake frame adapted for mounting on an associated part of a railway car truck, an inverted channel-section member comprising an integral horizontal top wall and spaced vertical inboard and outboard walls, a mounting element for said member on said top wall intermediate the ends thereof and comprising spaced vertical ribs extending from said top wall, a cross-piece interconnecting said ribs adjacent the top ends thereof affording a mounting for said frame on said part, spaced mounting plates for associated power means disposed at the ends of said member integral with said top wall and vertically aligned with said outboard wall, and a transverse vertical reinforcing rib extending from each plate to said top wall.

5. In a railway brake unit, a frame comprising a wall, an angularly related web fixed to said wall, a portion of said web being thickened intermediate its ends and extending approximately parallel to said wall, a link having a recess on one side thereof complemental to said portion and receiving the same therein, said link having ends extending approximately parallel to said wall beyond the opposite sides of said web, brake levers between the ends of said link and said wall, and removable pivot means extending through said levers, link and wall for maintaining the same in assembled relation and affording fulcrums for respective levers.

6. In a railway brake unit, a frame comprising a substantially horizontal wall, an approximately vertical web fixed thereto, a portion of said web having a surface extending approximately parallel to said wall and vertically spaced therefrom, a link seated on said surface and having a tongue and groove interlock with said portion, brake levers at opposite sides of said web between the ends of said link and said wall, readily removable pivot means extending through said levers and connected to said link and wall, and a vertical web extending transversely of said first-mentioned web and connected to one end thereof, and affording a mounting for power means for actuation of said levers.

7. In a railway brake unit, a brake frame including a wall with an angularly related web fixed thereto, a portion of said web extending approximately parallel to said wall, a link extending parallel to said wall having a tongue and groove interlock with said portion, brake levers bearing against said link and said wall, and readily removable pivot means extending through said levers and connected to said link and wall affording a pivot for said levers and maintaining said frame, link and levers in assembled relationship.

8. A railway brake unit comprising a wall, an angularly related web fixed thereto, a portion of said web extending substantially parallel to said wall, a link substantially parallel to said wall and spaced therefrom and removably seated on said portion and in tongue and groove interlocking engagement therewith, brake members extending between said link and wall, and readily removable pivot means extending through said members and connected to said link and wall to maintain the same in assembled relationship.

9. In a railway brake unit, a frame including a wall, a web extending substantially perpendicularly to said wall, a member at one side of said wall and spaced therefrom and extending generally parallel thereto and transversely of said web and interlocked intermediate its ends with said web, brake levers at opposite sides of said web between said wall and respective ends of said member, and pivot means projecting through each end of said member, adjacent lever and said wall, securing said member, levers and frame in assembled relation.

10. In a brake arrangement for a railway car truck including a frame and a wheel and axle assembly at an end of the frame, spaced rotors connected to said assembly for rotation therewith, brake means for said rotors comprising a support including a gear casing rotatably carried on said assembly between said rotors and connected at one side to said truck frame inwardly of said assembly, a beam member disposed outwardly of said end of the frame and connected intermediate its ends to said housing and extending transversely of said rotors outwardly thereof, mounting means at opposite ends of said member in alignment with respective rotors longitudinally of the truck, a power device removably mounted on each mounting means, a pair of brake levers seated on said member at opposite sides of each device and related rotor and operatively associated with the former for actuation thereby and carrying friction means for engagement with the latter, means overlying each pair of levers interlocked with said member, and pivot means extending through each lever and said last-mentioned means and said member connecting the same in assembled relationship.

11. In a brake arrangement, a truck frame including a transom, a wheel and axle assembly at an end of the frame outwardly of said transom, spaced brake rotors connected to the axle of said assembly for rotation therewith, a gear housing rotatably supported on the axle between said rotors, a torque connection between said housing and transom, a brake support comprising a beam member disposed outwardly of said assembly and removably connected to said housing, and a power cylinder and brake means for each rotor wholly carried by said beam member, said power cylinders being removable from said support independently of said brake means and being accessibly located outwardly of said beam member.

CARL E. TACK.
WESLEY A. HELSTEN.

REFERENCES CITED

The following references are of record in the file of this patent:

UNITED STATES PATENTS

| Number | Name | Date |
| --- | --- | --- |
| 917,891 | Pflager | Apr. 13, 1909 |
| 1,771,932 | Latshaw | July 29, 1930 |
| 2,180,092 | Oelkers | Nov. 14, 1939 |
| 2,267,560 | Farmer | Dec. 23, 1941 |
| 2,415,388 | Horton et al. | Feb. 4, 1947 |